(12) United States Patent
Tabe

(10) Patent No.: US 7,839,273 B2
(45) Date of Patent: Nov. 23, 2010

(54) VEHICLE INTERACTIVE ELECTRONIC WIRELESS AIR PRESSURE SYSTEM'S INFORMATION: "VIEW A PSI"

(76) Inventor: Joseph Akwo Tabe, 11700 Old Columbia Pike, Suite 717, Silver Spring, MD (US) 20904

( * ) Notice: Subject to any disclaimer, the term of this patent is extended or adjusted under 35 U.S.C. 154(b) by 1145 days.

(21) Appl. No.: 10/995,093

(22) Filed: Nov. 24, 2004

(65) Prior Publication Data
US 2005/0179531 A1   Aug. 18, 2005

Related U.S. Application Data

(60) Provisional application No. 60/524,641, filed on Nov. 25, 2003.

(51) Int. Cl.
*B60C 23/00* (2006.01)
(52) U.S. Cl. .................. 340/442; 340/572.1; 73/146
(58) Field of Classification Search ............... 340/440, 340/442, 572.1; 73/146
See application file for complete search history.

(56) References Cited

U.S. PATENT DOCUMENTS

| | | | | |
|---|---|---|---|---|
| 5,289,160 A * | 2/1994 | Fiorletta | ................ | 340/442 |
| 5,987,980 A * | 11/1999 | Mangafas et al. | ......... | 340/447 |
| 6,281,787 B1 * | 8/2001 | Lerg et al. | ............... | 340/442 |
| 6,571,617 B2 * | 6/2003 | Van Niekerk et al. | ...... | 340/447 |
| 2003/0136192 A1 * | 7/2003 | Tu et al. | ................... | 73/587 |

* cited by examiner

*Primary Examiner*—Davetta W Goins
*Assistant Examiner*—Samuel J Walk

(57) ABSTRACT

A vehicle tire communication and information system for viewing air psi and other characteristics that affects psi in a tire includes un-obstructive sensors embedded in a silicon substrate and etched in a re-enforced micro-fibered material to enable excellent detection platform, sensitivity, and selectivity within the detection environment. The embedded sensors facilitate detection and communication efficiency and transforms electrical energy into acoustic energy indicative of data transmission to a wireless electronic control module, allowing a nitride membrane to march the acoustic impedance of the air inside the tire to enable pressure waves indicative of the tire pressure.

63 Claims, 12 Drawing Sheets

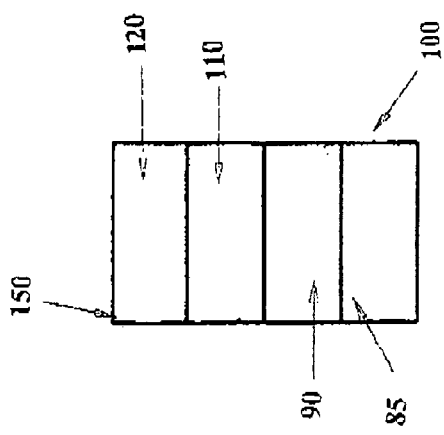

VEHICLE INTERACTIVE ELECTRONIC WIRELESS AIR PRESSURE SYSTEM'S INFORMATION: "VIEW A PSI"

I hereby claim priority benefits under 35 USC 119 of the Provisional Application, Ser. No. 60/524,641, filed Nov. 25, 2003.

TECHNICAL FIELD

The present invention relates to VIEW A PSI and directly linked to characteristics that influences change in tire air pressure. More particularly, VIEW A PSI is a vehicular interactive electronic wireless air pressure system's information center that uses in vehicle wireless electronic control module and/or computer to enhance communication between a vehicle wheels operation and the driver of the said vehicle to prevent accident through embedded tire sensors for generating valuable contextual tire information such as tire temperature, tire pressure, rim corrosion, valve stem contamination, and pressure balance on all said wheels and enabling audio visual communication thereon.

BACKGROUND OF THE INVENTION

In view of the statistical reports about tire failure type accident such as low air pressure and/or high tire temperature and their effects on accidents such as rollovers and flip-over, prior art devices have failed to keep tracks of the characteristics that affect tire air pressure. These characteristics include temperature effects on tire failures and how it affects tire pressure, tire design, and tire life. VIEW A PSI is an essential annotation to effectively allow retrieval of relevant information from tires Statistics have proven that failed tires such as un-balanced tire pressure or tire alignment have cost many deaths on the high way. The present invention relates to monitoring contextual characteristics influential to tire pressure change and is intended for keeping track of all the possible characteristics that enable tire failure. The present invention further allows audiovisual communication thereon between the driver and the electronic control module responsive to the database information collected from the tires. The present invention also uses useful, cheap, and un-obstructive sensors to enable interactive wireless communication between the wheels and the electronic control module. The system's hardware is configured with a detection platform designed to implement wireless communication indicative of normal signal responsive to characteristics to tire failure.

It should be noted however that, while less likely other prior art systems must have been developed to detect tire pressure or tire temperature, their approaches to reaching a contextual selectivity range is rather too expensive and less sensitive. The most obvious to this fact is the number of accidents occurring today caused by tire failure and the casualties involve. VIEW A PSI is a solution to these problems, and one which the public seems to be demanding if all the characteristics that affect tire failure are to be monitored and used at all. VIEW A PSI is a system that keeps track of activities between the tire and the rim and also inside the tire and communicates all the characteristics that affect tire failure. VIEW A PSI is operatively configured wherein a warning is enabled when any of said characteristics is detected. The system further keeps track of activities between the tire and the rim and also advances the intelligence to further keep track of the air inside the tire while enabling communication with the operator of the vehicle. While prior art devices have failed to leave to these tasks, VIEW A PSI is a solution for the tasks and has several advantages over prior art devices, including sensitivity and selectivity range. First, inevitably, the operator is informed of different changing characteristics of the tire. Second, the operator may make a quick decision to get the vehicle out of harms way. Finally, entirely, the operation of the vehicle is slowed or disabled by the operator, granting the operator enjoy and the benefits of saving lives.

In order to avoid some of the above problems, related art devices have incorporated measurement sensors into the rims of some vehicles to gather single or dual information about the tire pressure. These systems generally represent a less sensitive and expensive selections for tracking tire pressure. First, the sensors are hard sensors mounted on the rim and would not trigger certain secondary detectors. If the detector properly senses air pressure drop, a visual communication is simply enabled. These systems operate in anticipatory analysis that the driver is vigilantly envisioning signals on the dashboard, but have no way of enabling audio visually communicating through human voice responses to the driver's understanding about the specifics of the problem.

This is exemplified by U.S. Pat. No. 6,612,164, issued Sep. 2, 2003, to Meins, which shows the change in position of measuring point on a tire. Meins's device uses a fixed sensor to measure the transversal and longitudinal forces acting on the tire during driving. With this device, sensitivity is limited and vibration can cause the sensor to break easily since the fastening of the sensor is on the rim. Hence, U.S. Pat. No. 6,622,553, issued Sep. 23, 2003, to Hayashi et al, shows an air pressure-warning device with calculated module. This device operates by means of comparing excessive and deficient amount of air pressure on the basis of a pre-stored amount and a detecting air pressure and displaces the state of the tire thereon. Still, Hayashi et al devices are insensitive, more costly, and lack innovative means of communicating with the operator of the vehicle about the tire situation. U.S. Pat. No. 5.488,352, issued to Jasper discloses means of communicating between tractor and trailers, but failed in its entire entity, to teach an audio visual means of communicating tire failure to the operators of the vehicles. U.S. Pat. No. 6,608,554, issued Aug. 19, 2003 to Lesesky et al. discloses data communication means for heavy duty vehicles through electronic means and receiving data communication protocol from a remote data communication terminal. The Lesesky et al. device is not in any relation with tire pressure detection and adversely uses communication protocol to enable communication away from the focus of the instant invention. The above mentioned inventions, whether taken singularly or in any combinations, have failed to show any limitation in relation to the present invention.

SUMMARY OF THE INVENTION

The embodiment of the present invention includes various sensors such as RFID, air sensors such as MEMS, and other sensors such as piezoelectric sensors or in the other of:
 1. Piezoelectric through pattern recognition technique.
 2. Cantilever beam deflection technique.
 3. Piezoelectric Thin film sensors
 4. Infrared reflectometry technique
 5. Micro electro-mechanical system with RFID chip The specific nature of these various sensors is to reduce manufacturing cost and improve on data analysis while also enabling fast wireless communication before the vehicle or the driver experiences any such pre-analyzed failure. These sensors provide a better of 50 db and a better dynamic range in air to allow analytical efficiency of 99% accuracy or better, with less than 0.0000000001 false positive and false negative rates and low maintenance cost. These sensors also enable wireless sensing and communication and include silicon ultrasonic to facilitate the efficiency of transferring electrical energy into acoustic energy indicative of data transmission to a wireless electronic module or a computer means.

A nitride membrane is incorporated to march the acoustic impedance of the air pressure inside the tire, enabling pressure waves indicative of at least a tire pressure. The sensors are microscopic in structure to enable fabrications of thousands of cheap hair-like particles that emits high frequency ultrasound signals. Wherein other elements are incorporated to convert said sound into electrical energy to enable communications indicative of the electrical energy source. The electrical energy source is a representative of the contextual characteristics influential to tire pressure change. The hair-like structure of the sensors will facilitate the design detection means to produce a much less expensive system. These hair-like sensors are also non-destructible, non-contact, and their sensing pattern propagates through the air into the walls of the tires with the capability to return back through the air without gelling. Signal propagation responsive to cracks or any opening within the closed system of the tire structure. Because of the constant rotation and some degree of tire vibration, a non-contact sensor is very important for contextual detections, since it enables detection of tire characteristics in a moving vehicle. Such characteristics include tire temperature, tire pressure, tire fabric giveaway, contamination within the closed system, such as corroded valve stem or parts.

These sensors are embedded in a silicon substrate and fused/etched in a micro-fibered material and etched/fused in the tires to wirelessly detect the characteristics inside tires that could impede safe driving. Such characteristics include air temperature, tire temperature, air pressure, and other measuring point of the tire where the load carrying capacity is greater or lesser than the entire contact surface. The silicon substrate and the micro-fibered material are responsible for enabling increased sensitivity of the sensors. The selectivity of pressure measuring and other detection parameters are precisely effective with the incorporation of the re-enforced micro-fibered material and silicon substrate. That is, the invention teaches a thermostatic means of enabling the sensors in the instant invention to reduce the tire temperature when it increases above limit and to increases the tire temperature when it is below limit. The applicant acknowledges that prior art devices have no way of monitoring the temperature inside the tire and also concede that many fatal accidents occurred due to tire failure caused by temperature change within the system. The present invention reveals that, first sensors are embedded in a silicon substrate. Next, the silicon substrate with the embedded sensors is etched in a re-enforced micro-fibered material. Thirdly, the micro-fibered material is then fused to re-enforce the internal coating of the tire material to enable detection of tire characteristics. Keeping the temperature constant or within a fixed range and the sensing surface within a close distance from the air further increases sensitivity and communication within the closed system. These detection parameters are the dynamics of VIEW A PSI.

The dynamics of VIEW A PSI is such that tire surfaces are monitored for weaknesses and other conditions that may affect the safety operation of the vehicle. The micro-fibered material and the silicon substrate enable flexibility of the sensors and also allow the sensors to handle rough surfaces caused by vibrations, imbalances, directional torsions, and poor rotational angles. Communication is enabled inside the tire by means of optical radiation, reflection, or emission, and signals are wirelessly transmitted through the valve stem to the electronic control module by means of at least a radio wave transmission. The sensors are embedded in the silicon substrate and etched in the re-enforce micro-fibered material and then fused or embedded in the internal surface of the tire without utilizing any means of a mechanical connection to enable detection. All detections are enabled means of optical radiation, reflection, or by emitting signals within the system and through the valve stem. In some other embodiment, the sensors are seen to represent at least an RFID chip in the size of at least a human hair. The chip is embedded in a silicon substrate and etched in a micro-fibered material to further enable tracking of communication between sensors. These sensors are configured for networking with the electronic control module and the driver. The system is also configured for enabling interactive communication between the system of the instant invention and the driver of a vehicle, relaying detection of the dynamics of tire failure and/or destruction. Such that antennas are etched in the chip and faced outwordly to track these foreign objects traveling through wind waves inside the tire. The chip is embedded in a silicon substrate while the antenna is embedded in the chip.

DETAILED DESCRIPTION OF THE DRAWINGS

FIG. 4 is seen to represent a digital electronic control module analyzing tire information.

FIG. 5 is seen to represent a remote control programmer for enabling and disabling tire sensory platform

DETAILED DESCRIPTION OF THE INVENTION

The detailed embodiment of the present invention is disclosed herein merely as exemplary of the invention and may be embodied in various forms without misinterpreting the teachings as being limited in its entire scope, but merely as the basis for the claims and the basis for teaching one skilled in the art how to make and/or use the invention. The detailed embodiment as described is an advanced system and procedure for detecting faults and contextual characteristics in a closed system that influences pressure change.

Figure 1:
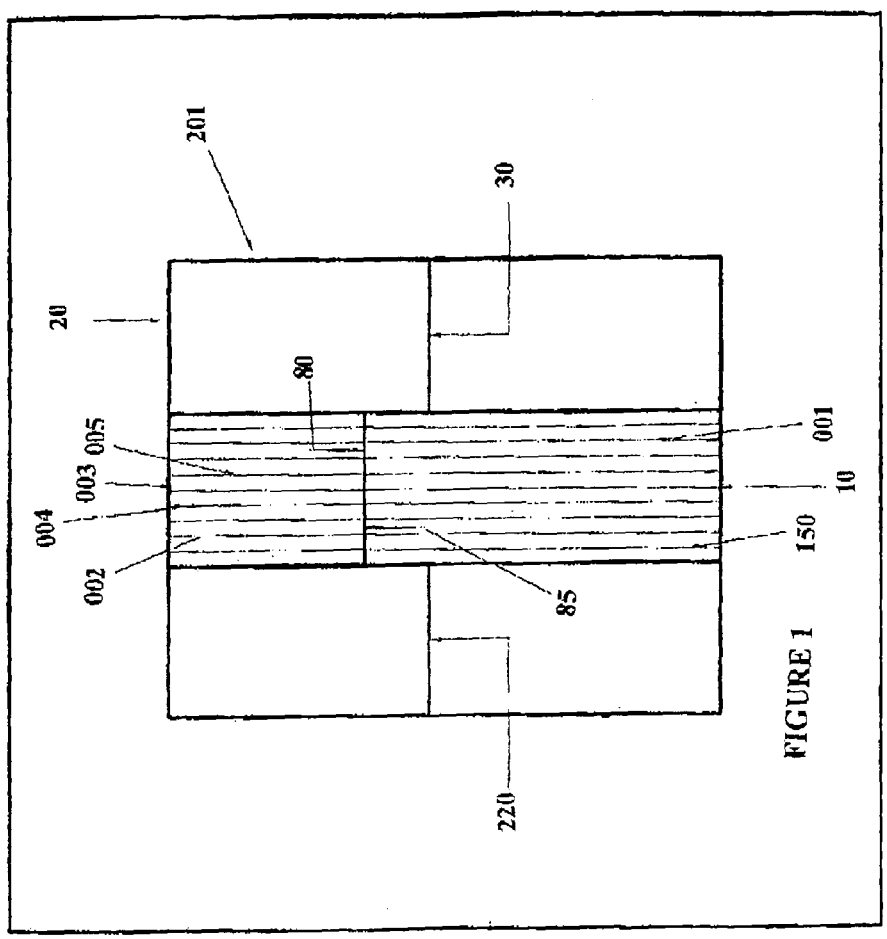
FIG. 1 is seen to represent materials used to manufacture tires with sensors embedded in a silicon substrate and etched in a re-enforced micro-fibered material for detection.

Seen in FIG. 1 are Sensors 001, 002, 003, 004, and 005, comprising of any or all of silicon ultrasonic 002, RFID chip 003, piezoelectric sensors 004, MEMS 005 and the like, embedded in a silicon substrate 10 to enable a platform for detection. Next, the silicon substrate 10 and the embedded plurality sensors 001, 002, 003, 004, and 005 are etched in a re-enforced micro-fibered material 20. The micro-fibered material 20 is of excellent electrical properties responsive to further advance the controllable thermostatic properties of the sensors in the closed environment of at least a tire apparatus. Thirdly, the micro-fibered material 20 is then fused in the tire material 201 to re-enforce the internal coating of the tire 200 with a sensory platform for detection. Antenna 80 and 150 are operatively configured with the platform. A transmitter 30 is configured with the platform. The platform further comprises embedded tags 85 and nitride membrane 220.

Figure 2:
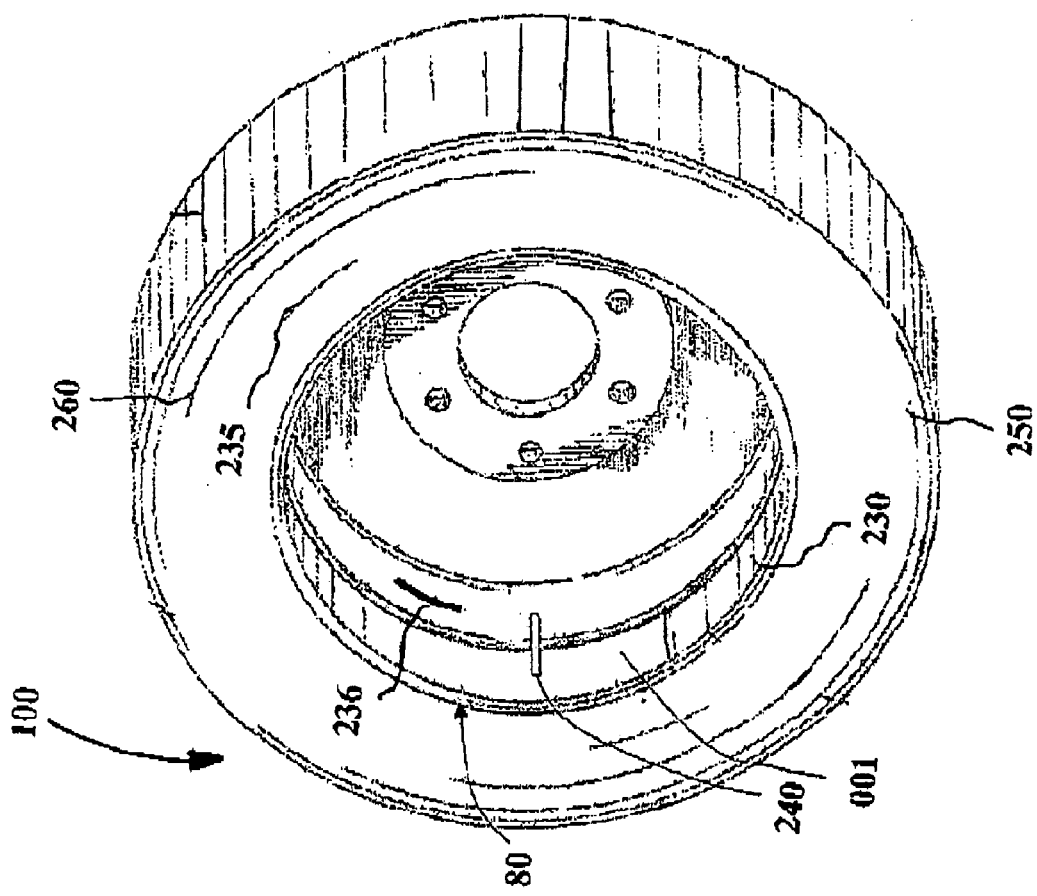
FIG. 2 is seen to represent a wired tire for releasing tire characteristics through the valve stem.

FIG. 2 further shows the tire material 201 comprising a platform responsible for enabling detection of contextual characteristics influential to pressure and/or property change. The sensor 001 further comprises antenna 80 communicatively configured with control module 100. Sensor 001 is in the platform etched/fused within the tire environment 250. Positioning of the platform within the tire environment enables monitoring of weaknesses around the tire walls 260, and is responsive to detection of corrosion 236, contamination 235, and air pressure 205 within the closed environment comprising the rim 230. The platform is further communicatively configured with a valve stem 240 for allowing communication between the tire 200 and the electronic control module 100 by means of any of optical radiation, reflection, or emitted signals. The control module is at least a power amplifier with IC or module to increase integration. The control module 100 also allows greater functionality and linearity. Referring to FIG. 1, the transmitter 30 is employed to enable communication to a receiving means and to wirelessly transmit all the detected signals.

Figure 3:
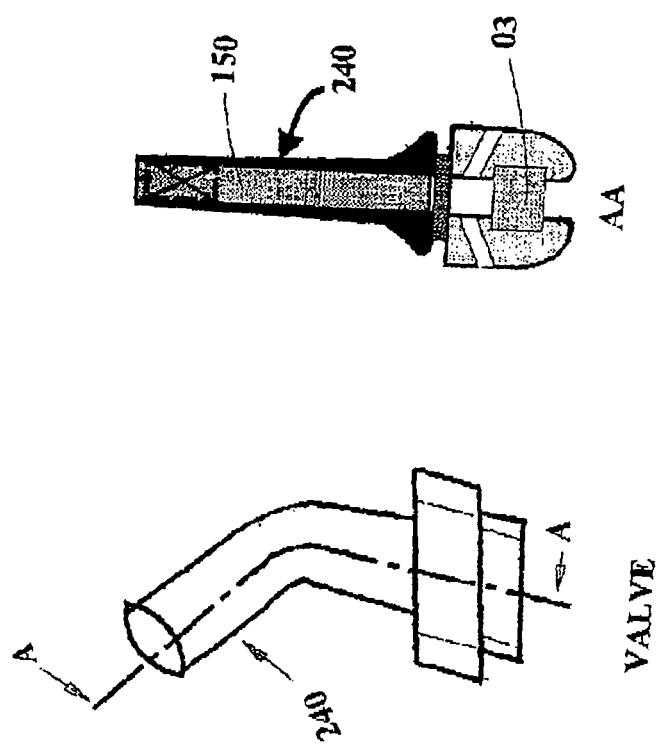
FIG. 3 is seen to represent a valve stem wired to communicate with the electronic control module.
Figure 6:
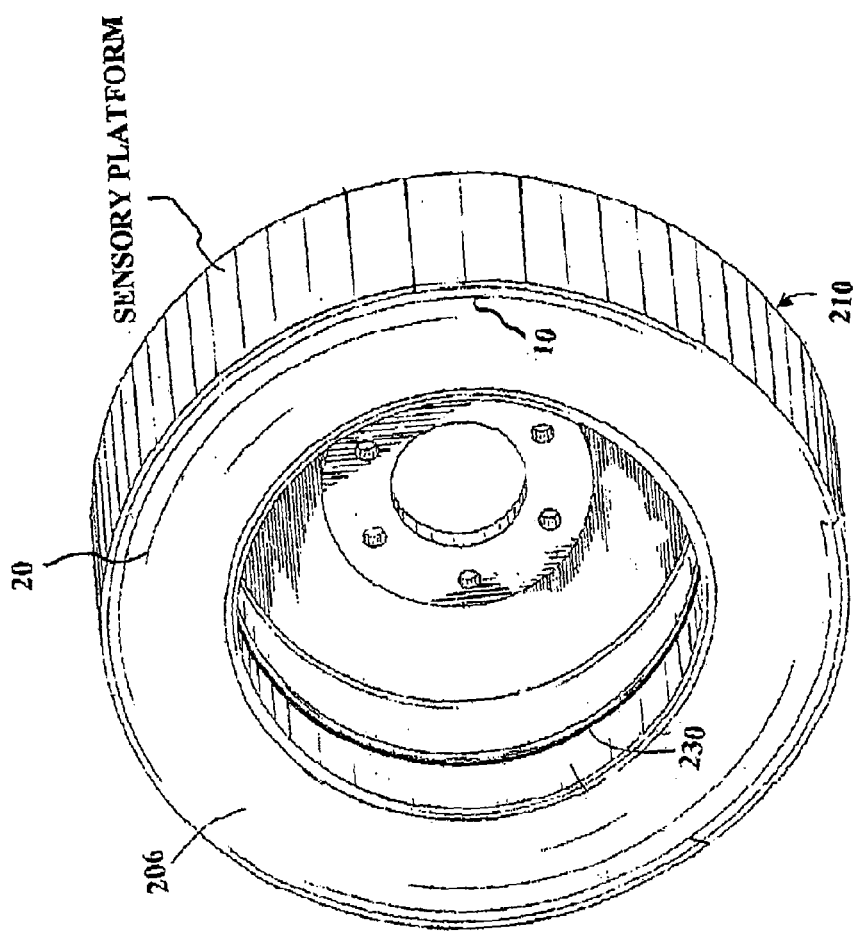
FIG. 6 is seen to show a sensory platform for detection and communication of tire characteristics influential to pressure change.

Referring to FIG. 3, a valve stem 240 is seen with sensor 03 and antenna 150 embedded within the valve as seen in section AA. Referring to FIG. 4, the communication network is further seen comprising a detection platform 120 comprising silicon substrate 10, tag 85, and an antenna 150. A control module 100 further comprises a reader 90 configured for reading detection signals. Referring to FIG. 5a, transistorized switches are communicatively disposed within the structures of the detection platform. Referring to FIG. 5b, the transistorized switches are further configured with the control module 100. Referring to FIG. 6, the silicon substrate 10 is seen etched/fused on a micro-fibered material 20 comprising a sensory platform. The sensory platform is disposed on the tire structure 210 comprising the rim 230. The sensory platform is further configured to detect weak area 206 within the tire structure 210.

Figure 7:
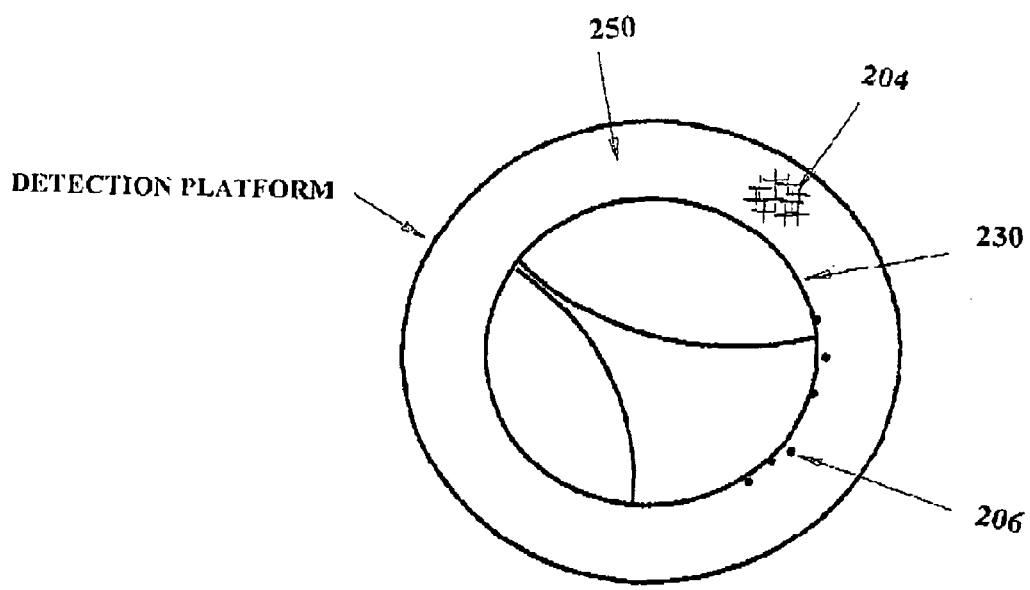
FIG. 7 is seen to show other elements inside the tire that are unwanted and detection is enabled by the sensory platform.
Figure 8:
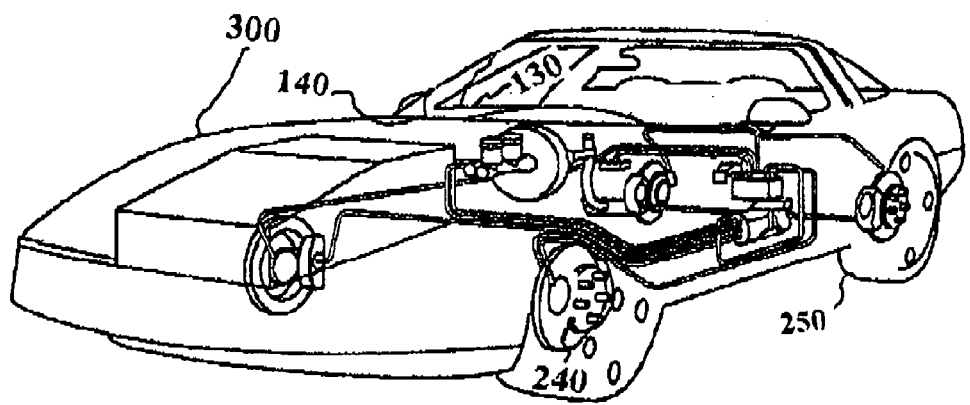
FIG. 8 is seen to represent a network information and communication environment for alerting the driver of a vehicle about tire conditions.
Figure 9B:
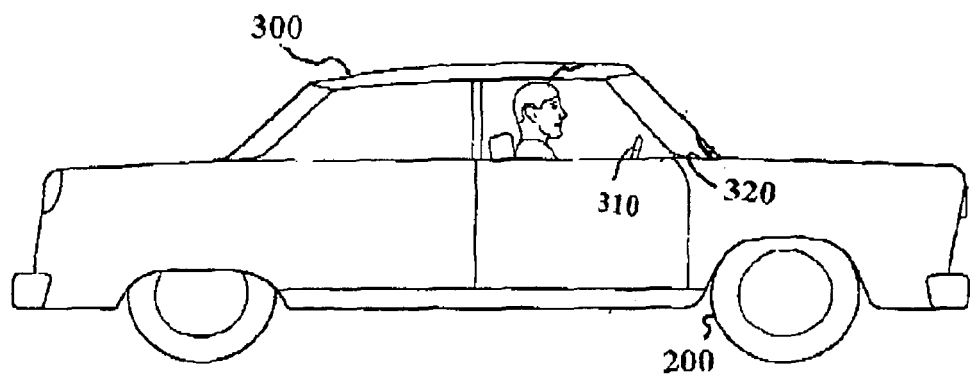
FIG. 9 is further seen to represent a wireless network of the tire system.
Figure 9A:
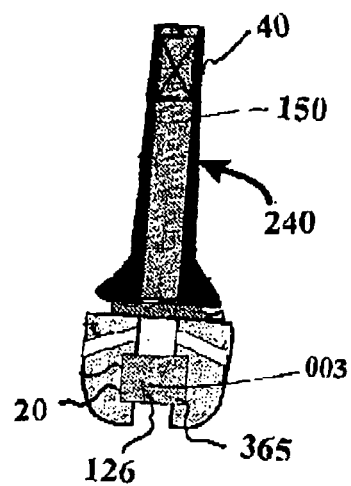
Figure 9C:
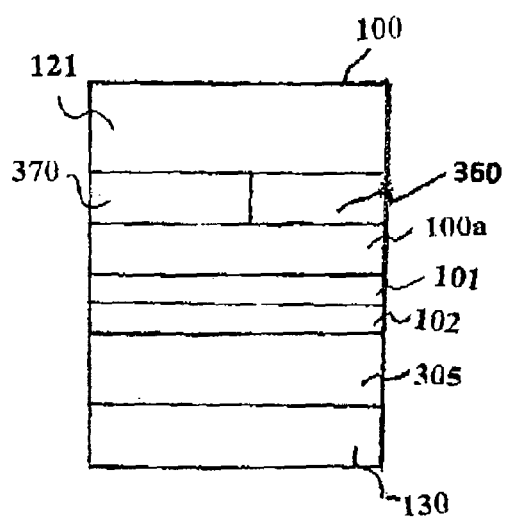

Referring to FIG. 7, the sensory platform is seen within the tire environment 250 further comprising the rim 230. The platform is further responsive to characteristics contained in the waves 204 or weak area 206. Referring to FIG. 8, The valve stem 240 is seen disposed within the tire environment 250 and further configured to enable communications to audiovisual devices 130 and 140 disposed within a vehicle 300 comprising a steering wheel. Referring to FIG. 9a, the sensory platform 126 further comprises micro-fibered material 20 configured with the valve stem 240 comprising sensor 003. Antenna 40 and 150 are further seen configured with transmitter/receiver 365. Referring to FIG. 9b is seen the vehicle 300 comprising a dashboard 320 configured with speakers for broadcasting communication signals from the tire 200 to the driver 310. Referring to FIG. 9c, a control module 100 is configured with an electromagnetic element 101. The control module further communicatively connected to an operating unit 102, which is operatively connected to an interface 121. The control module 100 is further configured with membrane 370 passing through memory 360 and communicatively configured with the audiovisual device 130. The control module 100 further comprises a microprocessor 305 operatively configured with software 100a.

Figure 9D:
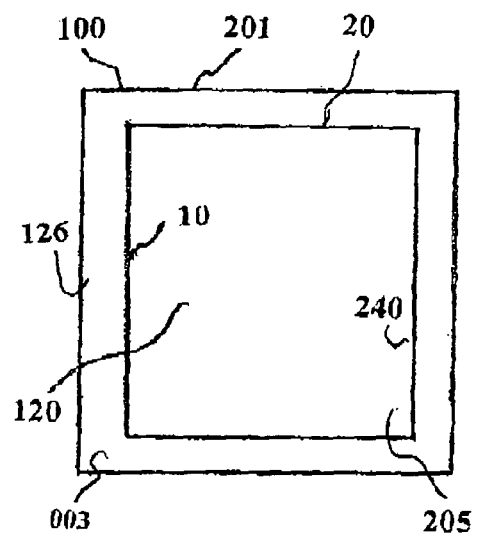

Referring to FIG. 9d, a detection platform 120 is seen comprising silicon substrate 10 etched/fused in a micro-fibered material 20. The detection platform 120 is disposed within the tire material 201. The tire material is configured with the rim and the valve stem. The valve stem 240 sown in FIG. 9a then reads and analyzes the signals through at least one such operational means comprising the RFID Chip 003. The RFID chip 003 is installed in at least an operational component comprising the sensory platform 125 and the valve stem 240. Detection communications are transmitted through the valve stem 240 as also seen in FIG. 3, to the electronic control module 100. The system of the present invention keeps the temperature constant and within a fixed range by means of the electrical properties for the re-enforced micro-fibered material 20. The configuration is further responsible for allowing the electrical properties to thermostatically control the temperature within the closed system.

The system also is configured to enable the sensing surface of the detection platform 120 to be in effective communication by enabling efficient detection and intelligence within the system's detection and communication environment. In addition, the location of the detection surface and the communication environment also allows the sensory platform to be in close proximity within a close distance from the air 205 to increase sensitivity and also improve effective communication between the system and the driver of a vehicle.

Figure 10:
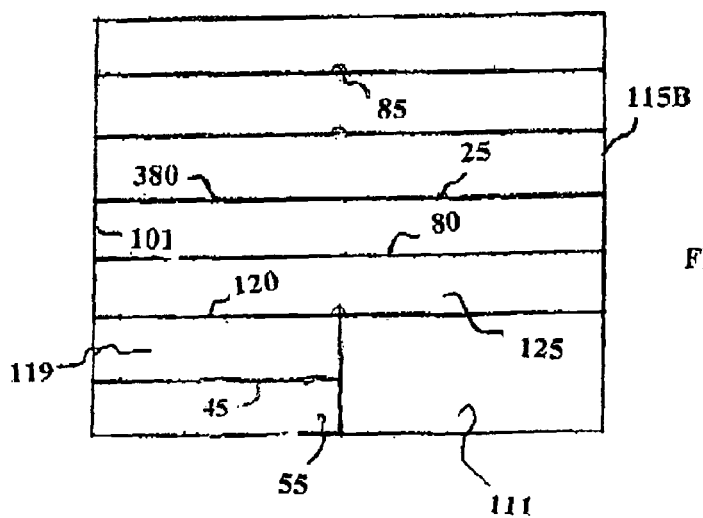
FIG. 10 is seen to represent a sensory platform with embedded antennas

Referring to FIG. 10 is seen other embodiment of the instant invention comprising the detection platform 120. The detection platform 120 is operatively configured with interactive detectors 45 and 55 to enable a sensory platform 125. The sensory platform is communicatively connected to a sensory circuitry 115B comprising microchip 380 configured with antenna 80 and tags 85. The detection platform 120 further comprises an LC circuit 119 operatively configured with memory 111. An electromagnetic element 101 is communicatively connected to the detection platform 120 and operatively configured with antenna 80. The antenna is operatively configured with excitation coil 25 to improve detection and communication signals.

Figure 11:
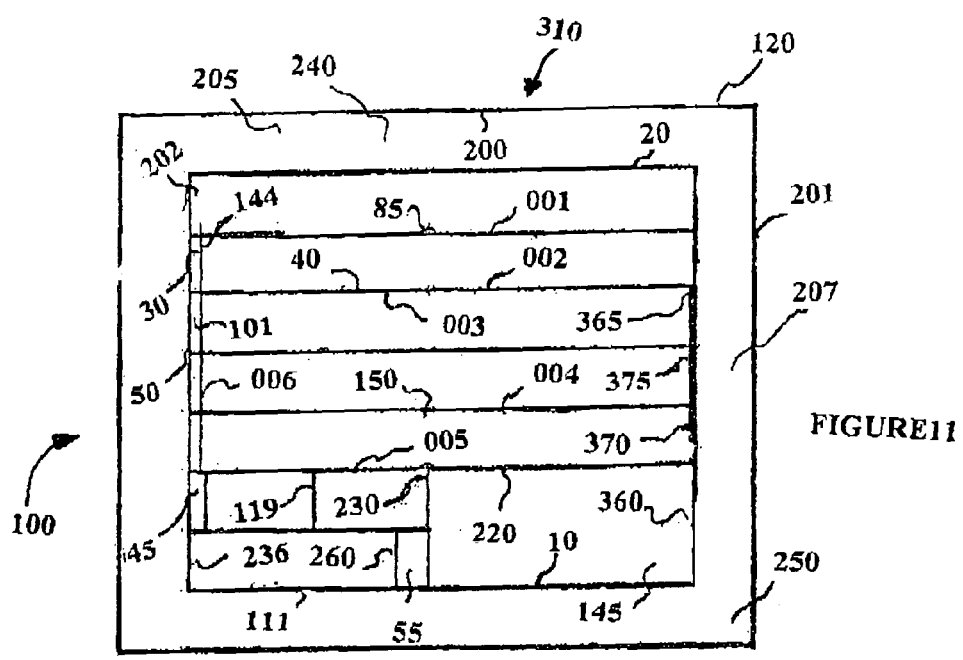
FIG. 11 is seen to represent a sensory platform fused on the tire material.

Referring to FIG. 11 is a sensory platform. The sensors 001, 002, 003, 004, and 005 are embedded in the silicon substrate 10 and etched in the re-enforced micro-fibered material 20. The micro-fibered material is fused or embedded in the internal surface of the tire 200 without utilizing any means of a mechanical connection, enabling better detection platform and detection sensitivity. The detections are enabled through optical radiation, reflection, or by emitting signals within the system and through the valve stem 240 as seen in FIG. 3 and FIG. 9a. In some embodiment of the present invention, the sensors 001, 002, 003, 004, and 005 are seen to represent at least an RFID chip 003 in the size of at least a human hair. The RFID chip 003 is embedded in a silicon substrate 10 and etched in a re-enforced micro-fibered material 20 to enable tracking of communication between sensors 001, 002, 003, 004, and 005 while networking with the electronic control module 100 and the driver 310 by enabling interactive communication thereon. One said communication is enabled by the system of the instant invention when the presence of the dynamics of tire failures and tire destructions are respectfully detected. Antennas 40 and 150 are etched in the sensors 001, 002, 003, 004, and 005, and faced outward to track foreign objects traveling through wind waves inside the tire 200 or the closed system.

The system also uses an RFID chip 003 as a receiving means such as a transmitter/receiver 365 to communicate with at least a MEMS 005 sensor. The configuration also enables separation between signal transmission and signal receivable, eliminating false positive and false negative detection while in communication with the wireless electronic control module 100. The system periodically scans the tire rim 230 for corrosion 236, allowing its sensing pattern to propagate through the air 205 into the walls 260 of the tires 200 and return back through the air 205 without gelling to inspect cracks or any possible opening within the closed system, such as the tire structure 210. The present invention in VIEW A PSI is a system that offers precise time resolution for highly accurate tire fault detection and information transmission to enable a networking environment and prevent vehicular failure. The platform robust hair-like nitride membrane 220 creates a non-resonant ultrasonic sensing with broad frequency responses to signal transformation to enable detection sensitivity.

The mass of the membrane 220 is negligible relative to the air 205 in the tire 200. This negligible mass is responsible for enabling an electrostatic force on the nitride membrane 220 to act while displacing the air 205 and generating an ultrasonic pressure wave signal that is transformable and readable by sensors 001, 002, 003, 004, and 005. Upon detection, the nitride membrane enables communications through the valve stem 240 to the wireless electronic control module 100. The limitation of VIEW A PSI also reduces signal ringing and signal distortion through the wireless power amplifier of the control module 100. The control module is further configured for transforming all other signals to electrical signal and/or acoustic signal to enable higher resolution for various detection applications. The system's ring up or ring down from the sensors 001, 002, 003, 004, and 005 make receiving echo more recognizable while facilitating the simplification of the detection algorithm.

The detection platform 120 further acts as the effective base for monitoring frequency change. The wireless electronic control module 100, which has an internal memory 360, acts as a reader by inputting and outputting signals and reading the information collected inside the tire 200, enabling communication through embedded antennas 40 and 150. The antennas 40 and 150 enable communication where human intervention has failed. The system acquires information within the tire environment 250, analyzes the nested information, and communicates wirelessly thereon to the wireless electronic control module 100. The detection platform 120 is operatively configured with interactive detectors 45 and 55 configured with tags 85. The detection platform 120 further comprises an LC circuit 119 operatively configured with memory 111. An electromagnetic element 101 is communicatively connected to the detection platform 120 and operatively configured with antenna 150. The antenna is operatively configured with transistorized switches 145 to improve detection and communication signals within the tire environment 250 and to network 50. A transmitter 30 is operatively configured with a battery 144. The battery is connected to membrane cell 375 configured with electromagnetic element 101 to further detect temperature 207 and other characteristics within the closed environment. The membrane cell 375 is further configured with membrane 370 to enable a planar surface 202. The tire 200 comprises a tire material 201 containing the detection platform 120.

Figure 12:
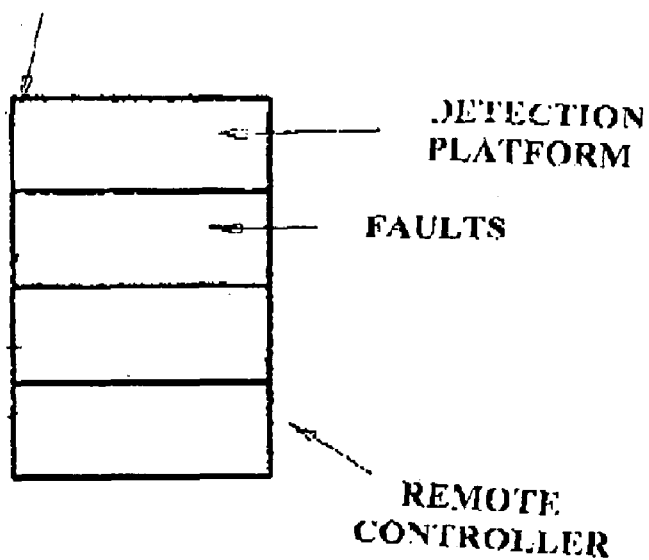
FIG. 12 is seen to represent a block diagram of the remote control.

Referring to FIG. 12, a remote controller is configured with the detection platform to remotely check for faults within the close system.

Figure 13:
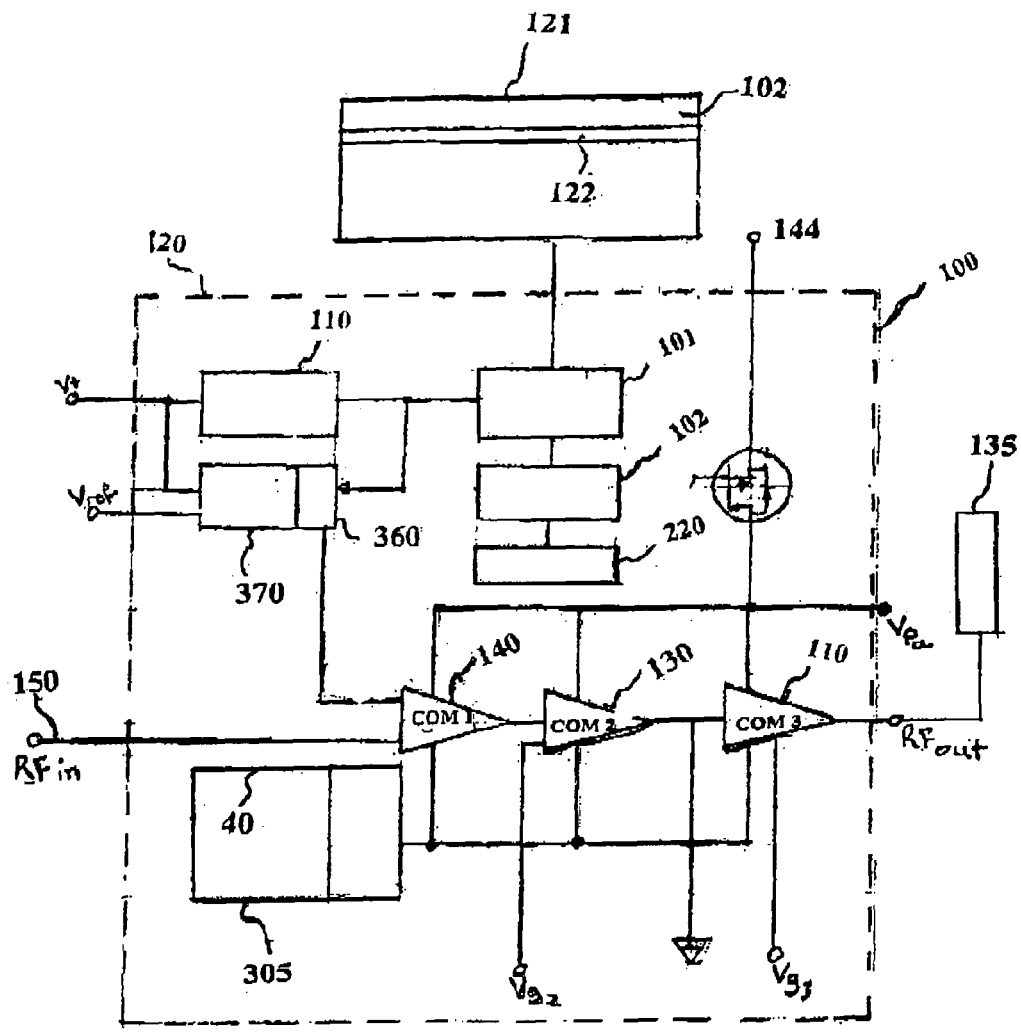
FIG. 13 is seen to represent a circuit diagram for the control module in wireless communication with the platforms.

Referring to FIG. 13, the control module 100 further comprises interface 121 configured with an indexing means 122. Antennas 40 and 150 are configured with the control module 100. Microprocessor 305 is communicatively connected to the control module 100 responsive to audiovisual communications 130 and 140. The audiovisual devices 130 and 140 are communicatively connected to speaker 135. A decoder 110 is configured with the control module 100 to decode signal communications. The memory means 360 is operatively connected to at least a discrete region comprising membrane 370. The operating unit 102 is configured with the control module 100 in communication with the tire material comprising detection platform. The detection platform further comprises nitride membrane 220 configured with battery 144, and communicatively connected to electromagnetic element 101.

The references in FIG. 9 is such that communication is enabled to inform the driver 310 of the vehicle 300 about the specifies of the detection through the information contained in the memory by means of a human voice or audio signal 130. The communication medium consist of broadcasting describable messages through the speakers 135 and/or by visual graphical signaling means 140 displayed on the dashboard 320 contents about the analyzed data. Since the tire rim 230 is a reflector device, the system requires that key operational component such as the tire 200, the rim 230, and the valve stem 240 be tagged 85 to leave no particular exposure to the outside environment. All data are communicated through the antennas 40 and 150 to the electronic control module 100. Signals are emitted through the valve stem 240 and received by the wireless electronic control module 100.

The tagging 85 is a decision that is made based on the tire size, rim size, the material structure of the micro-fiber and the tire, the tire shape, and the valve stem design. Antennas are embedded on both the tags 85 and the reader 90 to enable instant communication to the driver 310 of the vehicle 300. The detection and communications are important for preventing the driver from experiencing any future accident that could be prompted by the failing rotating tire 200.

In the same similar example of a closed system, typically includes a network 50 of vehicle tires 200 characteristically delivering information through wireless interactive means as seen in FIG. 8. The other embodiment of the invention is further seen in FIG. 1. The figure shows embedded antennas 40, 150 and the RFID chip 003 or at least sensor 001 seen to enable operation as a retractable device that reads information between the rim 230 and the tire 200. The information are said to be traveling through waves 204, such as radio waves or micro-waves as exemplified in FIG. 7. The antennas 40 and 150 are mediums responsible for communicating all information wirelessly to the electronic control module 100. The electronic control module 100 further enables wireless analysis and enable specific instructions for the driver's safety. The detection platform 120 in the tires 200 of the instant invention are amplified by the transistorized switches 145 and/or the control module, enabling the chip 003 to emit beams through the antenna means 150 responsive to information between the rim 230 and the tire 200 and in communication with the RFID chip 03 in the valve stem 240.

The detection platform emits invisible beams that travel through internal waves inside the tire 200 such as radio waves, microwaves, ultrasonic waves and the like. Each emitting wave responsive to current generated by the transmitter 30 and traveling through a trained pattern to read all the detection information, including locating the exact temperature, pressure and other variable characteristics of the tire 200. The detection information may also include unwanted activities prior to recognizable failure. The system uses in vehicle electronic control module or computer 100 and the embedded tire sensors to generate valuable contextual tire information. The information includes tire temperature, tire pressure, rim corrosion, valve stem contamination, and further including pressure balance on all tires 200, while enabling audio visual communication 130 and 140 between the electronic control module 100 and the driver 310

A typical chip for the application of VIEW A PSI is a radio frequency identification chip "RFID CHIP 003" with embedded antenna 150. Both the RFID chip 003 and the embedded antennas 40, 150 are further embedded in a silicon substrate 10 and then etched in a re-enforced micro-fibered material 20. Wherein, the re-enforced micro-fibered material 20, made of a non-ferrous material such as at least silver micro-fibers or gold, innovatively re-enforces the internal tire fabric 201 and enables a wired communication medium inside the tire environment 250. The communication medium sends tire information to the driver 310 through wireless means. The re-enforced silicon micro-fibered material 20 includes silicon ultrasonic for facilitating the efficiency of transforming electrical energy into acoustic energy indicative of data transmission to the wireless electronic control module 100 or a computer means. A nitride membrane 220 is incorporated in the electronic control module 100 for interactively marching the acoustic impedance of the air pressure 205 inside the tire 200. The marching is indicative of the transmitter transmitting pressure waves which is further indicative of at least a tire pressure and tire temperature condition.

In another embodiment, the present invention is seen in FIG. 4 and FIG. 9 having detection means 120, for detecting contextual characteristics that are influential to pressure change within a closed system. The detection means 120 includes a detection platform, having sensors 001, 002, 003, 004, 005, embedded in a micro-fibered material 20 having excellent electrical properties for enabling detection efficiency. The micro-fibered material 20 is then etched in a silicon substrate 10 to further enables efficient signal conduction, wherein the silicon substrate 10 in the macro-fibered material is either etched or fused on a second material, such as at least a material used for designing tires. The tire material is also used for etching or fusing with the detection platform 120, enabling the material component to form element of the closed system. The closed system forms the basis for detecting inflated pressure change and enabling communication through the RFID chip 003 on the valve stem 240, referencing detection communication to the reader 90 or the control module 100 on the dash board for broadcasting detection characteristics to the driver 310 of the vehicle 300. The broadcasting message is communicated in human voice auditory and/or graphical display means in connection with the control module and mounted on the dashboard 320. Many audio speakers are seen connected to (a) the control module 100 for receiving communication signals from the first many sensors 001, 002, 003, 004, 005, and the second many sensors 001, 002, 003, 004, 005. The sensors are responsible for enabling initial communication with the control module 100. The communications are readily initiated by the microprocessor 305. In addition, the microprocessor 305 is in wireless communication with the first and second plurality of interactive detectors 45, 55 responsive to selected human voice responses and timely outputting the responses indicative of broadcasting at least a selected specific detection.

The microprocessor 305 is further provided for receiving, storing, and processing data from the receiver means and enabling initial communication of the detection data through stereo speakers 135 to the driver 310 of the vehicle 300. The receiver 365 could be an RFID chip 003 embedded in at least a valve stem 240 of an inflatable closed system, and configured with a wireless infrared remote control in communication with the transmitter 30. 0 The transmitter 30 could also be an RFID chip 003 embedded a valve stem 240 of an inflatable closed system and having an I/R remote-extender. The RFID chip 003, receives wireless communication signals from the many sensors 001, 002,,003, 004, 005, on the detector platform and communicates the received signals wirelessly to the microprocessor 305. The microprocessor 305, upon receiving signals from the RFID chip 003, enables audio-visual communication to the driver 310 of the vehicle 300 through a stereo speaker 135.

The stereo speakers 135 outputs human voice auditory message from the microprocessor 305 and selectively broadcasting sensed emergency conditions to the driver 310 of the vehicle 300 to enable accident prevention. The voice auditory messages are embedded in a chip inside the microprocessor. The transmitter 30 is responsible for transmitting signals from at least the first and the second interactive detectors 45, 55 to a receiver means responsible for receiving signals from one of the first and/or the second sensory platform 120, 125. The microprocessor 305 stores and processes communicated data from the receiver and communicate detection data through the speakers to the driver 310 of the vehicle 300. The receiver 365 could be an RFID chip 003, embedded in a valve stem 240 of an inflatable closed system, and the transmitter 30 further comprises an RFID chip 003, embedded in at least a valve stem 240 of an inflatable closed system. The RFID chip 003 transmits and receives wireless communication signals from the detectors and communicates the transmitted and received signals wirelessly to the microprocessor 305 further configured for enabling audio/visual communication to the operator of a vehicle through stereo speaker means. The stereo speakers 135 are responsible for outputting human voice auditory message to the driver of the vehicle. The speakers 135 are further responsible for selectively broadcasting sensed emergency conditions to the driver of the vehicle to enable accident prevention.

In yet another embodiment of the instant invention, a first many of interactive detectors 45, 55 are seen in the detection platform 120, each of the many of interactive detectors 45, 55 selectively detects at least one of characteristics influential to pressure change, such that at least one of the many interactive detectors include at least a temperature detector, a contextual object detector, and a wheel vibration detector. A second interactive detector is seen to selectively detect at least one of selected sounds, unparallel motion, and pressure change.

In yet another embodiment of the present invention, many of transistorized switches 145 are seen to be embedded on the detection platform 120, for enabling thermal adjustment to environmental condition deemed influential to pressure change within a closed systems as seen in FIG. 11, wherein the closed system's operation is further deemed unsafe. The transistorized switches 145 are seen to be in connection with many temperature sensors 001, 002, 003, 004, 005, and each temperature sensor having a transmitter 30 and receiver 365. In addition, the transmitter 30 and the receiver 365 further enable networking and wireless communication with the first and the second many of interactive detectors 45, 55. Moreover, each of the temperature sensor further monitors the presence of thermal change within the closed system and each of the transistorized switches 145 further enables adjusting the thermal change within the closed system to a preferable degree, setting the premises for the detection platform 120 to prescribe a manufacturers recommended operating temperature and PSI range. Whereby each of the many transmitting means is responsive for transmitting signals from one of first and second many of interactive detectors 45, 55 to at least one receiver means responsive to the received signals. The responses are indicative of at least a signal communication from one of the first and/or second many of interactive detectors.

The wireless communication signals are transmitted through radio waves, microwaves, and ultrasonic waves. The second set of interactive detectors 45, 55 includes an RFID chip 003 embedded inside a valve stem 240 for enabling communication between the detection platform 120 and the microprocessor 305 in the presence of detection. Signals from the detection platform 120 are unique to each sensor, allowing the microprocessor 305 to store the unique detection data relating to each unique characteristic influential to pressure change. These characteristics enable the microprocessor 305 to communicate detected signals through the valve stem transmitters/receivers to the driver 310 of the vehicle 300 prior to detection.

Yet in other aspects of the invention, FIG. 9 and FIG. 10 depict the interactive detection platform 120 seen to include a first set of detectors 45 and a second set of detectors 55 communicatively connected to the control module 100. The first set of detectors and the second set of detectors are designed for enabling communication with the control module 100 and for communicating wirelessly through a wireless network to the driver 310 of the vehicle 300. Additionally, the first set of detectors and the second set of detectors have antennas. The antennas are one of a redundant antenna and a diverse antenna for enabling signal transmission to at least a remote control module 100. The communication signals are encoded and modulated prior to transmission. Antenna modules 40,150 are provided in each platform for transmitting/receiving at least a signal communication, and communicatively connected to a memory 111. The memory 111 is positioned between the sensors 001, 002, 003, 004, 005, and the antennas to enable defining the coded signals and all communication signals more effectively. The definition is set by reading wave frequencies and confirming the intensity of detection characteristics through wireless communication with the tire sensory platform 125, the valve stem sensor 240, the reader 90, and the driver of the vehicle.

The instant invention is further seen to monitor contextual characteristics influential to pressure change and for measuring the air pressure of closed systems using a sensory platform 125 monitoring system. Wherein the sensors 001, 002, 003, 004, 005, are embedded in a silicon substrate 10 and the silicon substrate 10 is then etched or fused in a micro-fibered material 20 to form (a) the sensory platform 125. The sensory platform 125 is then embedded, etched, or fused on a tire material 201 extending the platform inwardly from the rim 230 toward the tire. The sensory platform 125 detects and reports all contextual characteristics contained in the wheel assembly through the RFID chip 003 that receives and transmits the detection signals. Other sensors could replace the RFID chip 003, such that mounting at least one sensor on the sensory platform 126 of a valve stem 240 as seen in FIG. 9, and away from the rim 230 so that the sensors 001, 002, 003, 004, 005, do not protrude from the wheel responsive to communication between the tire sensory platform 125 and the driver of a vehicle through the valve stem sensory platform 126. The communication signals are directed through the tire sensory platform 125 to the valve stem sensory platform 126 and transmitted to the driver of a vehicle in human voice auditory message/graphic signal. Wherein, the voice auditory message is in response to the specific detection, broadcasting the specific indication of contextual characteristics of the detection within the closed system. Such detection could be at least temperature change, pressure change, sound, unparallel motion, or rim corrosion.

The instant invention further teaches a method of view a PSI for monitoring contextual characteristics influential to pressure change and for measuring the air pressure in a closed system. The sensory platform 125 is seen to include code-able sensors 001, 002, 003, 004, 005, for a tire monitoring device. As seen on the FIGS. 8 and 11, the sensors 001, 002, 003, 004, 005 are embedded in a silicon substrate 10, and etched in a micro-fibered material 20 for use in many of the tires on a motor vehicle. Each sensory platform 125 have a wireless signal transmitter 30, for transmitting signals to a second sensor comprising an RFID chip 003, which is mounted in the valve stem 240. The specific signals include specific code representation of context base tire condition, empowering the RFID chip 003 to communicate the specific coded signals to a reader 90 inside the vehicle, and for broadcasting the detection in human voice auditory through the stereo speakers 135.

Other methods could be used for monitoring contextual characteristics influential to pressure change and for measuring the air pressure in a closed system, allowing the memory 111 to provide means for identifying the specific transmitted codes. However, embedding many sensors 001, 002. 003, 004, 005 in the silicon substrate 10, and etching the silicon substrate 10 in a micro-fibered material 20 for use in tires 200 is innovative and and responsive to the specific code of the sensory platform 125. The sensory platform 125 is responsible for communicating the code through antenna module 40, 150 through which the signal is transmitted to an RFID chip 003. The communication signals from the sensory platform 125 to the valve stem RFID chip 003, and from the RFID chip 003 to the reader, is a radio frequency (RF) signal, and the signal from the RFID chip 003 to the driver of a vehicle is a voice auditory message/graphic signals. The platform is design and coded to monitor contextual characteristics influential to tire pressure change and consist of: rim corrosion, tire unbalanced, tire vibration, tire pressure change, temperature change, tire acceleration, and other aspects called Q factor within the closed system that may influence unsafe driving, etc. Each sensory platform having a wireless signal transmitting means for transmitting detection communication through at least a specific code representation of the tire condition. The antennas are selectively coupled with sensors 001, 002, 003, 004, 005 in the platform circuitry to enable dividing the RF signal into database signal assignment for communicating with the reader the specific detection type and for determining tire acceleration value and comparing the value with a pre-set tire acceleration value at vehicle speed. The sensory platform. 125, 126 operational functions are determined based on the intensity of the RF amplitude signal.

Still, in other embodiment of the invention, the detection means includes a detection platform 120, having sensors 001, 002, 003, 004, 005, embedded in at least a micro-fibered material 20, whereby the micro-fibered material 20 having excellent electrical properties for enabling detection efficiency, is etched in at least a silicon substrate 10, to enable efficient signal conduction. The silicon substrate 10 is fused on a tire material for enabling designing the detection platform 120 in proximity within a closed system. The closed system is the basis for detecting inflation pressure change and other characteristics that influences change in pressure within a closed system. The closed system further enables communication signal for communicating detection characteristics to the driver of the vehicle. The detection platform and the control module are configured with at least a memory means 360 for analyzing all signal communication. The memory means 360 is operatively connected to at least a discrete region comprising membrane 370. The transmitter 30 further energizes the detection platform 120 and also enables analyzing data transmission through interactive wireless communication with the wireless control module 100.

Many transistorized switches 145 are seen in FIG. 5 embedded on the detection platform 120 of FIG. 11 for enabling thermal adjustment to environmental condition. The transistorized switches 145 are further connected to many temperature sensors 001, 002, 003, 004, 005, whereby each of the temperature sensors 001, 002, 003, 004, 005 configured with at least a transmitter 30 and a receiver 365 for enabling networking and wireless communication with the first and the second interactive detectors 45, 55. Each of the temperature sensors also monitors the presence of thermal change within the closed system, and each of the transistorized switches 145 also enables adjusting the thermal change within the closed system to manufacturer's recommended operating temperature and PSI range. The audio speakers are connected to the control module 100 comprising a microprocessor means and receives communication signal from the first sensors 001, 002, 003, 004, 005 and the second sensors 001, 002, 003, 004, 005, and responsible for enabling the communication signals to be readable by a microprocessor 305 and/or a reader 90. The microprocessor 305 further enables wireless communication with the first and second interactive detectors 45, 55 and also is responsible for enabling a selected human voice auditory response, outputting messages indicative of at least a matching selected specific detection.

The present invention is further seen designed for monitoring contextual characteristics within a closed system such as a tire system used in a motor vehicle as shown in FIG. 9. A code reader 90 is seen coupled to the control module 100 which is provided and installed on the dashboard 320 for reading information from the sensory platform 125. The reader 90 is wirelessly connected to a control module 100 responsive to communications with the information interface 121. The interface 121 has an indexing means 122 and other information interface that are mounted in the valve stem 240. The indexing means 122 is operatively configured with an operation unit 102 further comprising adjustable operational parameters responsive to operational profiling for the closed system. The control module 100, which is coupled to the code reader 90, is connected to the operation unit 102, which is arranged to receive information from the code reader 90. The detection platform 120 is seen to further include electromagnetic elements 101, which are responsible for enabling communication with the information interface 121. The information interface 121 is coupled to the control module 100, which is mounted at the dashboard 320. The control module 100 is communicatively connected with the microprocessor 305 responsible for communicating wirelessly the detection characteristics through voice auditory or visible graphic means on the dashboard 320.

In other aspects of the present invention, the silicon substrate 10 is seen to be embedded/fused in a micro-fibered material 20 configured with an excitation coil 25 as seen in FIG. 10. The excitation coil 25 is responsible for generating an interrogation signal representation as affected by the tags 85 on the sensors 001, 002, 003, 004, 005 and in response to the sensors proximity to the sensory platform 125. The detection platform 120 and the sensory platform 125 are disposed on a planar surface 202 with the excitation coil 25 surrounding the detection platform 120. The detection platform 120 is part of (a) an LC circuit 119 comprising measurable electrical characteristics that are only altered by external conditions. The external condition being one of: applied force, temperature, humidity, environmental influences, and induced light by at least a foreign object. The LC circuit 119 further comprises resistive elements and/or without resistive elements. One such resistive element comprises at least a capacitor, and another such resistive element further comprises at least an inductor.

It is anticipated that the incorporation of a non ferrous micro-fibered material 20 within the fabric 201 for the tire 200 and the RFID chip 003, or re-enforcing silver micro-fiber material 20 in particular, allows the electrical properties of the material to respond to temperature conditions 207 and also to other characteristics contained within the body of the tire environment 250. The responsiveness to these characteristics enables effective environmental conditioning of the tire sites, such as temperature 207 and contamination 235 contained within the air space 205 for the closed system. Such that, in a real severe environmental weather condition, the electrical properties of the re-enforce silver micro-fiber 20 will reverse or bias the environmental situation, enabling the system to thermostatically operate partly as an HVAC control system and partly as a system designed for networking, and largely as a protective and monitoring device configured for the detection of air pressure change, temperature increase, and temperature drop within the closed system.

Communication for the system is enabled when any of such detection is sensed. That is, when the chip 003 encounters any detection signal, wireless communication is enabled through the antennas 150 on the sensors 001, 02, 03, 04, and 05 to the antennas 40 on the valve stem sensors and the electronic control module 100, enabling the platform and the sensor energy to amplify the communication signals. Referring to FIG. 11, the network 50 further enables wireless communication between at least any of MEMS 005, piezoelectric sensors 004, and RFID chip 003, tracking down other characteristics and activities within the tire 200 to interactively communicate with the electronic control module 100 and the driver 310 of the vehicle 300. Because many particulates of different substances can be contained in wind waves caused by contamination 235, the embedded sensors 001, 02, 03, 04, and 05 are outlined and configured to single out each concentration of the various particulate that may be sensed or detected within the detection environment. The configuration further enables effective sensitivity and reliability to the detection of absolute tire failure responsive to safety and to preventing accident. The re-enforced silver micro-fibered material serves as air filter element sensing medium for absorbing particulates and analyzing their wavelike properties, while enabling the antennas 40, 150 to provide thermal means of vaporizing and evaporating the particulates to increase detection selectivity and sensitivity.

The thermal means is an HVAC responsible for thermostatically providing responses to other environmental conditions affecting the tires 200 and the vehicle's safe operation, and for bursting reliability under all weather conditions while also effectively allowing retrieval of relevant information from all tires 200 through the common network system of the instant invention. The thermal means is seen enabled for preventing failed tires such as un-balanced tire air pressure 205 from causing any accident that could lead to deaths on the high way. The system of the present invention keeps track of all the possible characteristics that enable tire failure through innovative platform means for detection of context base characteristics that are influential to pressure change and enabling audio visual communication through the microprocessor means coupled on the electronic control module 100 for communicating with the driver 310 of the vehicle. The communication is indicative of the database information collected on the tires 200.

VIEW A PSI is a tire monitoring network 50 for enabling communication through the electronic control module 100 to the driver 310 of a vehicle by at least a radio frequency signaling means generated by embedded transmitters 30. The tires 200 include an antenna system 150 for transmitting and receiving the radio frequency signals from the sensors 001, 002, 003, 004, and 005, which are empowered by the transistorized switches 145 and the embedded transmitter 30. Sensor signals are encoded and modulated by the encoded frequency, enabling the electronic control module 100 to then decode the signals through signal decoder 110 and enable the signals to be processed. Decoded signals are then transmitted through interface 121 to an audiovisual means 130 and 140 for enabling reliable reading of the transmitted tire information. Since large surface of the tire 200 is an ideal support platform for the sensors 001, 002, 003, 004, and 005, VIEW A PSI justifies the use of these sensors in its computing architecture, enabling intelligence augmentation to automate selectivity tasks depending on the environmental situation and the impedance of the transmitter 30. During tire replacement, a remote controller 103 is used for decoding the sensor sensitivity. The main focus of VIEW A PSI besides tire information and detection is on communication and interaction between the driver 310 and the vehicle's tire operation.

One embodiment of the instant invention is illustrated in FIG. 3, showing a block diagram of an active wireless control module 100. The wireless control module 100 includes a microchip 305 or microprocessor configured with a voice auditory means and in wireless communication with the detection platform. Preferably the microchip 305 is placed in circuit communication with the detection platform 120 in the first and/or second sensory circuitry layer and having the detection platform 120 acting as a sensor with plurality embedded antenna 80. Preferably the RFID chip 003 and the microchip 305 are wirelessly coupled to the detection platform 120 with the second sensory circuitry layer 115b as seen in FIG. 10. The wireless coupling is achieved by merely being in close enough proximity with elements of the instant invention.

The detection platform 120 and the microchip 380 include a transmitter/receiver 365, a battery 144, and a memory 111 as seen in FIG. 13, and are in circuit communication with the valve stem RFID chip 003 and the control module microprocessor 305. The transmitter/receiver 365 receives radio frequency (RF) signals from the RFID chips 003 having communication link with the interrogator or a reader 90 through any of the sensor antennas 40, 80 150. The transmitter/receiver 365 converts the RF signal to datagram and communicates the data to at least a processor 305 where the data is received and processed. The processor 305 stores the processed data in the memory 111. The processor 305 also enables responses to data and communicates the responses to the transmitter/receiver 365. The transmitter/receiver converts the responded data to RF signal and communicates the signal through any of the sensor antennas 40, 80, 150 to the reader 90 or interrogator.

The antenna structures are coupled with the microchips wirelessly to enable communication with the RFID device. These antenna structures are in many sizes and shapes and employ parasitic or passive antenna elements which cooperate electromagnetically with the active antenna elements to enhance retransmission and reception signals. The antennas are driven by the transmitter signal to transmit/receive data. The microprocessor 305, which is invisibly wired on a silicon chip, is programmable for enabling multitasking such as communicating with the remote control to enable activating and deactivating the sensory platform. The microprocessor 305 is also pre-wired with fixed sets of instructions such as enabling communication in human voice auditory when detection is enabled. The remote control receives new instruction sets through wireless communication with the control module's intelligent software. The control module's operating system is rapidly configurable to enable integration with many sensors on the platform, transforming the platform into a single safety and security brain "sensory platform" for monitoring contextual characteristics influential to pressure change within a closed system. One such software for the control module is visual recognition software for identifying coded transmission signals indicative of context base detection. The voice over graphics "VOG" communication is powered by transistorized switches in the control module, acting as amplifier modules. The valve stem sensory platform is networked with the tire detection platform and the control module to enable tracking detection signals and enabling at least simultaneous transmission of detection/communication signals through at least a radio or ultrasound signals.

It is to be understood that the scope of the present invention is not limited to the above description, but encompasses the following claims;

The invention claimed is:

1. VIEW A PSI apparatus for detecting fault and for monitoring contextual characteristics influential to pressure change within a closed system, including at least a vehicle component, comprising:
   at least a sensor means embedded in at least a silicon substrate and etched/fused in at least a micro-fibered material operatively configured for enabling effective detection platform;
   said detection platform comprises at least a detection means responsive to specific detection; and
   at least a communication means.

2. VIEW A PSI apparatus of claim 1, wherein said communication means further comprising at least a transmitter means operatively configured with said detection means.

3. VIEW A PSI of claim 2, wherein said detection means further responsive to at least a predetermined contextual characteristics influential to at least pressure change.

4. VIEW A PSI apparatus of claim 1, wherein said sensing means further comprises nano-sensors responsive to plurality sensors for plurality detections through nanotechnology applications.

5. VIEW A PSI apparatus of claim 1, wherein said detection means is configured within a closed system, whereby said closed system further comprises at least one of an assembled vehicle tire and a closed flow line.

6. VIEW A PSI apparatus of claim 1, wherein said communication means further comprising means for transmitting and receiving analog or digital signals of varying frequencies.

7. VIEW A PSI of claim 1, wherein said nano-sensors in said nanotechnology applications further include at least a MEMS and at least an RFID chip.

8. VIEW A PSI apparatus of claim 1, wherein said sensor means comprises a plurality of sensors, each said plurality of sensors responsive to at least a specific detection of contextual characteristics influential to pressure change, and wherein the communication means further configured with said sensor means to enable a real-time alert upon detection.

9. VIEW A PSI apparatus of claim 8, wherein the at least one sensor further provides an indication of at least contextual characteristics contained within the closed system of a tire means and enabling communication to a vehicle operator.

10. VIEW A PSI apparatus of claim 9, wherein the plurality sensors further comprises micro-sensor elements comprising MEMS or an RFID chip, and wherein at least said micro-sensor is configured with means to communicate audio/visual indication of said detection of said contextual characteristics.

11. VIEW A PSI apparatus of claim 10, wherein said plurality sensors further includes at least one acoustic wave sensor.

12. VIEW A PSI apparatus of claim 1, further comprising discrete regions configured with at least membranes communicatively connected to the sensor means.

13. VIEW A PSI apparatus of claim 1, wherein said microfibered material exhibiting electrical properties responsive to thermal control and for re-enforcing detection sensitivity.

14. VIEW A PSI apparatus of claim 1, wherein said detection means further configured to detect selected sounds, unparallel wave motion, and at least a Q factor responsive to contained pressure change, and wherein at least a communication is enable thereon.

15. View a PSI apparatus of claim 1, wherein said detection means further responsive to interrogation signal responsible for tracking emergency conditions over time, and further responsive to fault severity.

16. VIEW A PSI apparatus of claim 1, said detection platform further comprising said sensor means embedded in at least a silicon substrate and fused/etched in at least a microfiber material responsive to re-enforcing the effectiveness of said detection means to enable at least multiple specific detections.

17. VIEW A PSI apparatus of claim 1, wherein said sensor means further comprises multifunctional array disposed in said silicon substrate and/or said micro-fiber material configured to exhibit electrical properties responsive to detection sensitivity and/or selectivity.

18. VIEW A PSI apparatus of claim 1, wherein said sensor means comprises at least a silicon substrate.

19. VIEW A PSI apparatus of claim 18, wherein said silicon substrate is etched/fused in at least a micro-fibered material to enable at least an effective detection platform.

20. VIEW A PSI apparatus of claim 19, wherein said micro-fibered material comprises at least a first material exhibiting electrical characteristics.

21. VIEW A PSI apparatus of claim 20, wherein said first material is further fused/embedded in at least a second material for manufacturing at least an element of said closed system.

22. VIEW A PSI apparatus of claim 21, wherein said second material comprises at least an element of a vehicle wheel comprising at least a closed system.

23. VIEW A PSI apparatus of claim 21, wherein said detection platform comprises means for enabling detection of context base characteristics affecting pressure change within said closed system.

24. VIEW A PSI apparatus of claim 1, wherein said detection means comprises at least a detection platform.

25. VIEW A PSI apparatus of claim 1, wherein said communication means comprises at least a processing means responsive to plurality of detections.

26. VIEW A PSI apparatus of claim 25, wherein said processing means further comprises at least one of a receiving means and a transmitting means.

27. VIEW A PSI apparatus of claim 1, wherein said sensor means operatively configured with said detection means.

28. VIEW A PSI apparatus of claim 1, wherein said communication means operatively configured with said detection means.

29. VIEW A PSI apparatus of claim 1, further includes means for enabling interactive monitoring and communications.

30. VIEW A PSI apparatus of claim 29, wherein said means further comprising at least a transducer responsive for transforming detection signals into electrical energy.

31. VIEW A PSI apparatus of claim 29, wherein said means for enabling interactive monitoring and communications interfaces with at least an antenna means responsive for providing signal communication and for filtering out signal output to enable improved signal to noise ratio and communication clarity.

32. VIEW A PSI apparatus of claim 1, wherein at least one said sensor communicatively configured to exhibit at least a predefined nominal operating state and each said sensor configured with means for generating respective electrical signals in response to each said nominal operating state of said closed system.

33. VIEW A PSI apparatus of claim 1, wherein said communication means further comprises at least a processing means, said processing means further comprising means for analyzing detection data and enabling communications when at least a detection is enabled.

34. VIEW A PSI apparatus of claim 33, wherein said communication means responsive to signal communication through at least a frequency medium.

35. VIEW A PSI apparatus of claim 34, wherein said receiving means further comprises at least an RFID chip communicatively configured on at least a valve stem responsive to interactive communications.

36. VIEW A PSI apparatus for detecting fault and for monitoring contextual characteristics influential to pressure change within a closed system, including at least a vehicle component, comprising:
   at least a sensor means embedded in at least a silicon substrate and etched/fused in at least a micro-fibered material and operatively configured for enabling an effective detection platform within the structure of at least a second material;
   at least a communication means; and
   said detection platform comprising an interactive monitoring means operatively configured to relay to at least a communication means.

37. VIEW A PSI apparatus of claim 36, wherein said communication means comprising means for analyzing detection signals.

38. VIEW A PSI apparatus of claim 36, wherein said detection means responsive to characteristics affecting pressure change within a closed system and operatively configured with means for transforming said detection signal communication into electrical energy.

39. VIEW A PSI apparatus of claim 38, wherein said means for transforming said detection signal into electrical energy further includes at least a transducer.

40. VIEW A PSI apparatus of claim 36, wherein said closed system further includes a tire assembly and said contextual characteristics of the tire assembly further comprising at least one of; rim corrosion, tire unbalanced, tire vibration, tire pressure change, tire temperature change, tire acceleration, and at least a Q factor.

41. VIEW A PSI apparatus of claim 36, wherein at least one communication means is operatively connected to at least a valve responsive to signal communications.

42. VIEW A PSI apparatus of claim 36 further includes at least a transmitting means in communication with said sensing means.

43. VIEW A PSI apparatus of claim 42, wherein said transmitting means responsible for energizing the detection platform and responsive to interactive wireless communication.

44. VIEW A PSI apparatus of claim 36, wherein said detection platform further comprising providing a substrate across which is distributed an array of discrete regions, said discrete regions having membranes communicatively connected with said sensor means, and wherein at least said communication means disposed in selected areas of the vehicle interior responsive to audio visual/human voice auditory.

45. VIEW A PSI apparatus of claim 36. wherein said sensor means further configured for providing optical radiation corresponding to at least a first wavelength responsive to the discrete region of at least a membrane.

46. VIEW A PSI apparatus of claim 45, wherein said communication means further responsive to wireless communications, wherein said wireless communications is enabled through at least one of: radio waves, microwaves, and ultrasonic waves.

47. VIEW A PSI apparatus of claim 36, wherein said detection means operatively configured with means for transforming detection signals into readable data relating to unique specific detection influential to pressure change within (a) the closed system.

48. VIEW A PSI apparatus of claim 36, wherein said detection means further comprising at least an antenna means operatively configured the transmitting means for transmitting detected signal communications to at least a remote location, and responsive to reducing false signal communications.

49. VIEW A PSI apparatus of claim 36, wherein said communication means operatively configured with said detection means responsive to interactive communications, and wherein said communication means further comprising at least an RFID chip disposed at (a) the valve of said closed system, wherein said RFID chip having at least readable means communicatively configured with said detection means, said readable means comprising at least in vehicle microprocessor responsive to audio/visual voice auditory communications to the operator of said vehicle.

50. VIEW A PSI apparatus of claim 36, further comprising at least a transistorized switch means communicatively connected to said detection means for amplifying detection signal output, wherein said transistorized switch means further includes means for enabling thermal control of said detection platform.

51. VIEW A PSI apparatus of claim 50, wherein said transistorized switch means further comprising means for effectively elevating the electrical characteristic level of at least a first material for the closed system, and wherein said elevation of said electrical characteristics further includes at least one of the applications of resonant frequency, harmonic spectra, and a Q factor.

52. VIEW A PSI apparatus of claim 36, wherein said sensor means further includes at least the transmitting means, said transmitting means further comprises at least a transmitter responsive to detection signals to enable said interactive wireless communications with said communication means.

53. VIEW A PSI apparatus of claim 36, wherein said micro-fibered material exhibiting electrical properties responsive to thermal control and for re-enforcing detection sensitivity.

54. VIEW A PSI apparatus of claim 36, wherein said detection means further configured to detect selected sounds, unparallel wave motion, and at least a Q factor responsive to contained pressure change, and wherein at least a communication is enabled thereon.

55. VIEW A PSI apparatus of claim 36, further comprising said sensor means comprising plurality of sensors each embedded on at least a silicon substrate and fused/etched in a micro-fiber material for re-enforcing the effectiveness of said detection platform, and wherein each sensor responsive to specific detection and said detection platform comprising an LC circuit comprising measurable electrical characteristics altered by external conditions.

56. VIEW A PSI apparatus of claim 36, wherein said micro-fiber material comprises transistorized switches operatively configured to enable thermal adjustment to environmental change.

57. VIEW A PSI apparatus of claim 36, wherein said communication means further includes at least one of a receiving means and a transmitting means, including at least an RFID chip operatively configured with an FM receiver.

58. VIEW A PSI apparatus of claim 57, wherein said transmitting means responsive to transmittable signals and said receiving means responsive to receivable signals communicatively connected to said communication means.

59. VIEW A PSI apparatus of claim 58, wherein said receiving means and said transmitting means communicatively connected to an antenna means and operatively configured with said communication means, said communication means further comprises pattern recognition technique.

60. VIEW A PSI apparatus of claim 36, wherein said communication means further configured with at least a memory means further configured for data storage.

61. VIEW A PSI apparatus of claim 60, wherein said communication means further includes means for transmitting and receiving analog and/or digital signals of varying frequencies.

62. VIEW A PSI apparatus of claim 61, wherein said communication means configured to convert detection signals into useful analytical.

63. VIEW A PSI apparatus of claim 62, wherein said communication means further comprises means for enabling audiovisual communication, further comprising at least a speaker means for outputting said communication in human voice auditory.

\* \* \* \* \*